United States Patent
Hejlsberg et al.

(10) Patent No.: US 7,860,823 B2
(45) Date of Patent: Dec. 28, 2010

(54) GENERIC INTERFACE FOR DEEP EMBEDDING OF EXPRESSION TREES IN PROGRAMMING LANGUAGES

(75) Inventors: Anders Hejlsberg, Seattle, WA (US); Matthew J. Warren, Redmond, WA (US); Henricus Johannes Maria Meijer, Mercer Island, WA (US); Dinesh C. Kulkarni, Sammamish, WA (US); Mads Torgersen, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 667 days.

(21) Appl. No.: 11/464,874

(22) Filed: Aug. 16, 2006

(65) Prior Publication Data
US 2007/0271233 A1  Nov. 22, 2007

Related U.S. Application Data

(60) Provisional application No. 60/746,439, filed on May 4, 2006.

(51) Int. Cl.
*G06F 7/00* (2006.01)

(52) U.S. Cl. ...................... 707/603; 707/805

(58) Field of Classification Search ............... 707/1–10, 707/100, 603, 805, E17.005
See application file for complete search history.

(56) References Cited

U.S. PATENT DOCUMENTS 6,370,541 B1 * 4/2002 Chou et al. ............. 707/103 X

| | | | |
|---|---|---|---|
| 2003/0182364 A1* | 9/2003 | Large et al. | 709/203 |
| 2003/0215067 A1* | 11/2003 | Ordille et al. | 379/88.13 |
| 2005/0183058 A1* | 8/2005 | Meijer et al. | 717/100 |
| 2006/0080288 A1* | 4/2006 | MacLaurin et al. | 707/3 |
| 2006/0190927 A1* | 8/2006 | Albahari et al. | 717/114 |
| 2007/0027849 A1* | 2/2007 | Meijer et al. | 707/3 |
| 2007/0028163 A1* | 2/2007 | Meijer et al. | 715/513 |

OTHER PUBLICATIONS

Ee-Peng Lim et al. 'Export Database Derivation and Query Processing for Object Oriented Wrappers.' In: International Symposium on Cooperative Database Systems for Advanced Applications (CODAS), 1996, pp. 337-345, section 5.
Don Smye. Leveraging .NET Meta-programming Components from F Integrated Queries and Interoperable Heterogeneous Execution Association for Computing Machinery (ACM) Whitepaper ML'06, Sep. 16, 2006, Section 1, Introduction, sections 1.2 and 3.3.
International Search Report for PCT Application No. US2007/006576 dated and mailed Sep. 18, 2007, 3 pgs.

* cited by examiner

*Primary Examiner*—Mohammad Ali
*Assistant Examiner*—John P Hocker
(74) *Attorney, Agent, or Firm*—Workman Nydegger

(57) ABSTRACT

The claimed subject matter provides a system and/or a method that facilitates querying data utilizing an explicit representation of an embedded language. An IEnumberable component can receive a data operation that can be employed on a collection of data utilizing at least one of an IEnumerable interface and an IEnumerable<T> interface. A mirror component can provide a generic interface to query the collection of data by representing the collection of data as an expression tree utilizing at least one function that mirrors the at least one IEnumerable interface and the IEnumerable<T> interface.

16 Claims, 12 Drawing Sheets

GENERIC INTERFACE FOR DEEP EMBEDDING OF EXPRESSION TREES IN PROGRAMMING LANGUAGES

CROSS REFERENCE TO RELATED APPLICATION(S)

This application claims the benefit of U.S. Provisional Patent Application Ser. No. 60/746,439 filed on May 4, 2006, entitled "A GENERIC INTERFACE FOR DEEP EMBEDDING OF EXPRESSION TREES IN PROGRAMMING LANGUAGES." The entirety of which application is incorporated herein by reference.

BACKGROUND

The advent of global communications networks (e.g. the Internet) now makes accessible an enormous amount of data. People access and query unstructured and structured data every day. Unstructured data is used for creating, storing and retrieving reports, e-mails, spreadsheets and other types of documents, and consists of any data stored in an unstructured format at an atomic level. In other words, in the unstructured content, there is no conceptual definition and no data type definition—in textual documents, a word is simply a word. Current technologies used for content searches on unstructured data require tagging entities such as names or applying keywords and metatags. Therefore, human intervention is required to help make the unstructured data machine readable. Structured data is any data that has an enforced composition to the atomic data types. Structured data is managed by technology that allows for querying and reporting against predetermined data types and understood relationships.

Programming languages continue to evolve to facilitate specification by programmers as well as efficient execution. In the early days of computer languages, low-level machine code was prevalent. With machine code, a computer program or instructions comprising a computer program were written with machine languages or assembly languages and executed by the hardware (e.g., microprocessor). These languages provided an efficient means to control computing hardware, but were very difficult for programmers to comprehend and develop sophisticated logic.

Subsequently, languages were introduced that provided various layers of abstraction. Accordingly, programmers could write programs at a higher level with a higher-level source language, which could then be converted via a compiler or interpreter to the lower level machine language understood by the hardware. Further advances in programming have provided additional layers of abstraction to allow more advanced programming logic to be specified much quicker then ever before. However, these advances do not come without a processing cost.

The state of database integration in mainstream programming languages leaves a lot to be desired. Many specialized database programming languages exist, such as xBase, T/SQL, and PL/SQL, but these languages have weak and poorly extensible type systems, little or no support for object-oriented programming, and require dedicated run-time environments. Similarly, there is no shortage of general purpose programming languages, such as C#, VB.NET, C++, and Java, but data access in these languages typically takes place through cumbersome APIs that lack strong typing and compile-time verification. In addition, such APIs lack the ability to provide a generic interface to query data, data collections, and the like.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate creating an expression tree representation to allow the implementation of a data operation. A mirror component can create an expression tree representation that allows various data operations and/or querying to be implemented utilizing a generic interface IQueryable and IQueryable<T>, wherein the IQueryable and IQueryable<T> mirror IEnumerable and IEnumerable<T>. An IEnumerable component can provide a generic collection type that particularly works on a collection of data and has specific and rigid characteristics. In addition, the IEnumerable component can employ a set of query standard query operator extension functions such that each such operator can take delegates as their arguments (e.g., as defined in any suitable namespace). The mirror component can replicate the IEnumerable and IEnumerable<T> to provide a generic interface that allows querying of the created expression tree by utilizing the IQueryable and IQueryable<T>, wherein the IQueryable and IQueryable<T> versions of the standard query operator extension methods take the created expression tree rather than a delegate as their arguments.

In accordance with one aspect of the claimed subject matter, the mirror component can implement a query processor. The query processor can utilize a data operation associated with IEnumerable, such as, but not limited to, a Where, Select, SelectMany, a filter function, a grouping function, a transformation function, any suitable function that is compatible with the IEnumerable interface and/or the IEnumerable<T> interface, etc. The mirror component can create the expression tree representation of the collection of data (e.g., a query can produce the collection of data and the collection of data is represented by an expression tree), wherein the representation can be a more generic and query-friendly type of data for any suitable query processor.

Moreover, the mirror component can provides a pluggable architecture for a query processor that allows data to be queried locally, remotely, over a wire, etc. regardless of programming language and/or format. For instance, an expression tree that represents a collection of data can be created (e.g. a query can produce the collection of data and the collection of data is represented by an expression tree), then various data operations can be implemented thereupon (e.g. remotely, locally, etc.). Moreover, such data can be queried in a remote location the same as querying data in the memory of a local computer. In other aspects of the claimed subject matter, methods are provided that facilitate creating an expression tree representation to allow the implementation of a data operation.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
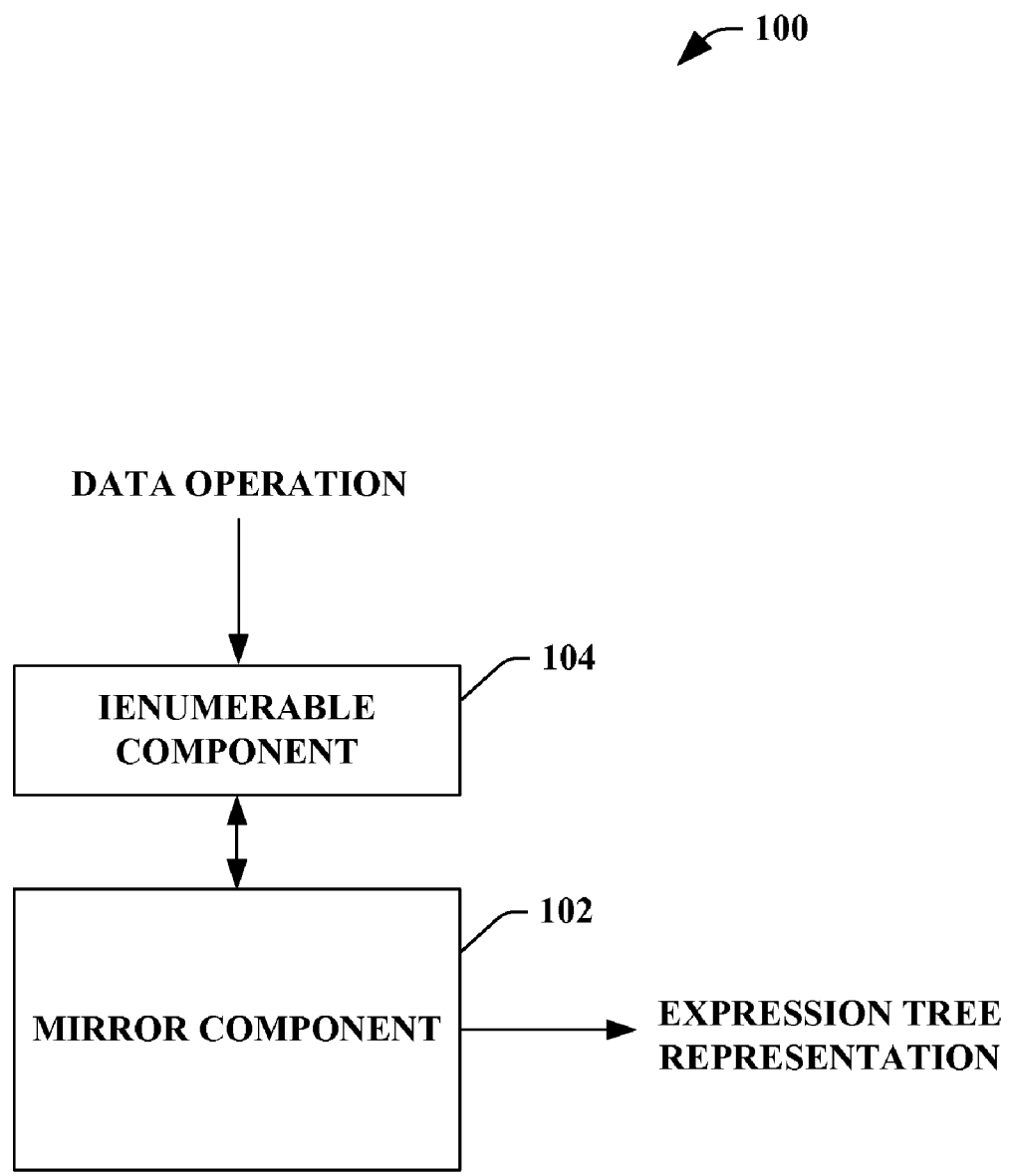
FIG. 1 illustrates a block diagram of an exemplary system that facilitates creating an expression tree representation to allow the implementation of a data operation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "processor," "query," "operation," and the like are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates creating an expression tree representation to allow the implementation of a data operation. The system 100 includes a mirror component 102 that can provide a generic interface to query data by implementing an IEnumerable component 104 that can receive a data operation to implement on such data. The IEnumerable component 104 can provide a generic collection type that particularly works on a collection of data and has specific and rigid characteristics. For instance, the IEnumerable component 104 can employ various standard query extenders such as, but not limited to, Where, Select, SelectMany, a filter function, a grouping function, a transformation function, etc. on the collection of data utilizing a specific programming language that is compatible with the generic collection type. In addition, the IEnumerable component 104 can employ a set of query standard query operator extension functions such that each such operator can take delegates as their arguments (e.g. as defined in any suitable namespace).

The mirror component 102 can replicate the functions associated with the IEnumerable component 104 and, in particular, the IEnumerable interface and the IEnumerable<T> interface. Such replication of the IEnumerable component 104 allows the mirror component 102 to provide a standard interface IQueryable<T> and a non-generic counterpart IQueryable that types can implement to signal that deep embedding of queries via expression trees are supported. The mirror component 102 can employ an expression tree representation of the collections of data and queries. By representing queries and the collections of data as expression trees, the IQueryable and IQueryable<T> interfaces can be generic interfaces that can be utilized to implement data operations since the data type is more conducive to query processor based on expression tree representation. Therefore, the system 100 facilitates querying relational data, extensible markup language (XML) objects, object oriented languages, programming languages, and the like.

The mirror component 102 can create an expression tree representation based on a collection of data (not shown) and query that is to be queried. For example, a collection of data can be filtered based on a predicate function, wherein conventionally, the IEnumerable interface and IEnumerable<T> interface were restricted to particular types, operations, characteristics, and/or formats. Yet, by allowing the mirror component 102 to provide a generic interface that can replicate/mirror the IEnumerable and IEnumerable<T> functions, an expression tree representation can be created from the collection of data and query to allow a query, a data operation, and the like to be implemented thereto. In general, it is to be appreciated that the expression tree representation allows any suitable query processor to implement data operations (Where, Select, SelectMany, a filter function, a grouping function, a transformation function, etc.) therewith. In other words, the system 100 provides a pluggable architecture for a query processor that allows data to be queried locally, remotely, over a wire, etc. regardless of programming language and/or format. For instance, the system 100 allows a representation of the query expression to be created, then sent to the data and be allowed to be implemented remotely. Moreover, such data can be queried in a remote location the same as querying data in the memory of a local computer.

Figure 2:
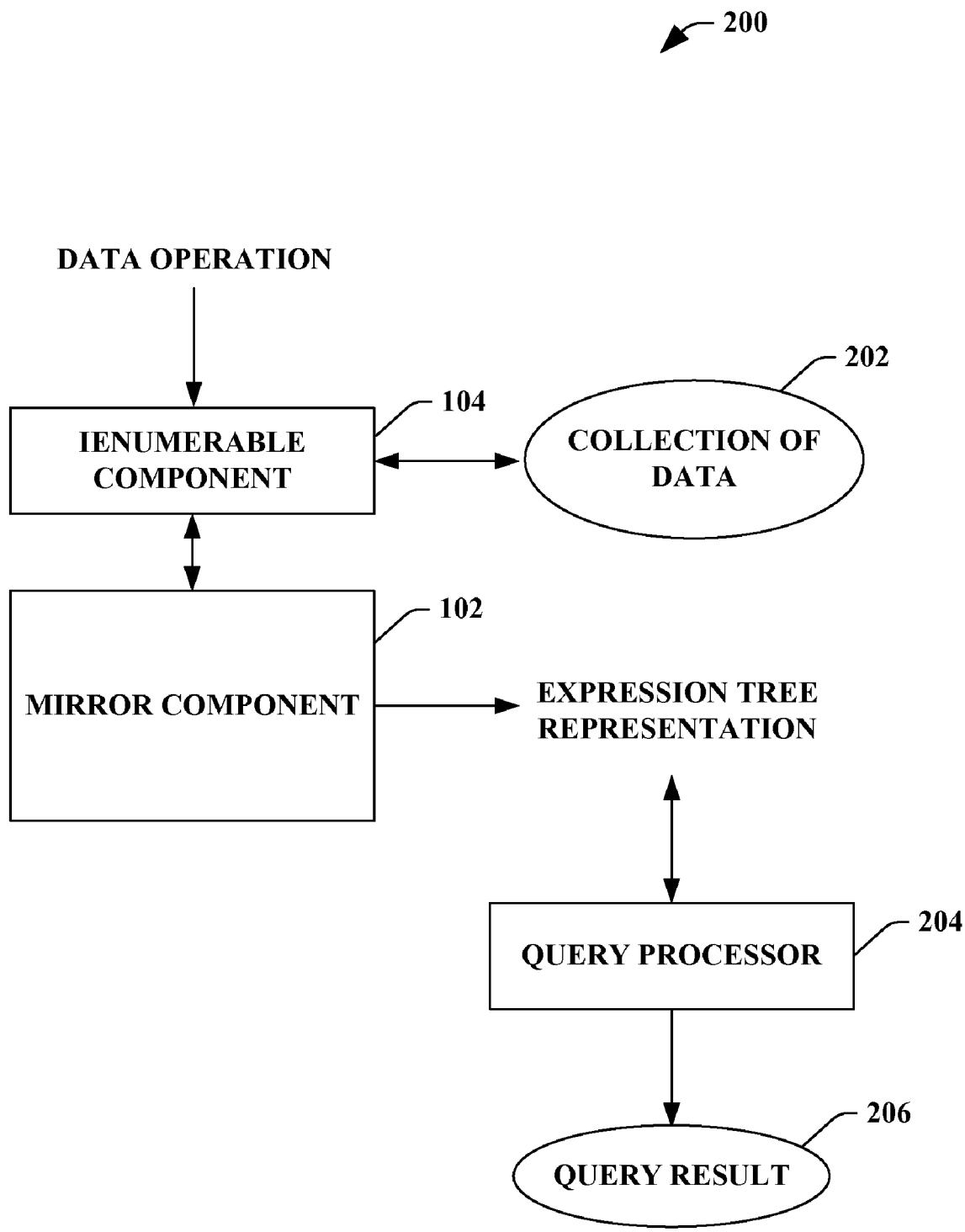
FIG. 2 illustrates a block diagram of an exemplary system that facilitates utilizing an expression tree representation of a collection of data to employ a data operation with a query processor.

FIG. 2 illustrates a system 200 that facilitates utilizing an expression tree representation of a collection of data and query to employ a data operation with a query processor. The system 200 can include the IEnumerable component 104 that can receive a data operation to be implemented upon a collection of data 202, wherein such data operation can be, for example, a Where, Select, SelectMany, a filter function, a grouping function, a transformation function, any suitable function that is compatible with the IEnumerable interface and/or the IEnumerable<T> interface, etc. The mirror component 102 can create an expression tree representation of the collection of data and query that can be a more generic and query-friendly type of data for any suitable query processor. In general, the mirror component 102 and the created expression tree representation allows the data operators related to the IEnumerable component 104 (e.g., IEnumerable interface, IEnumerable<T> standard query operators, etc.) to be implemented by any particular programming language rather than being restricted by IEnumerable and IEnumerable<T> characteristics, format, data structure, and the like.

The mirror component 102 replicates the IEnumerable and IEnumerable<T> interfaces and standard query operator extension methods with IQueryable and IQueryable<T> interfaces and standard query operator extension methods. For instance, wherever IEnumerable-based operation has a delegate argument (e.g., an operation such as a transformation of elements, operation to group elements, etc.), the IQueryable-based operators have an expression tree representation as their argument. This mirroring allows the system 200 to define the standard interface IQueryable<T> and its non-generic counterpart IQueryable to signal that they support deep embedding of queries via expression trees.

Moreover, upon the creation of the expression tree representation, a query processor 204 can be implemented to provide a query result 206. It is to be appreciated that the mirror component 102 creates the expression tree representation such that any suitable query processor 204 can query the collection of data 202 based upon any IEnumerable interface and/or IEnumerable<T> interfaces being replicated by IQueryable and IQueryable<T>. In other words, the system 200 can be pluggable with any suitable query processor to provide a query result.

Figure 3:
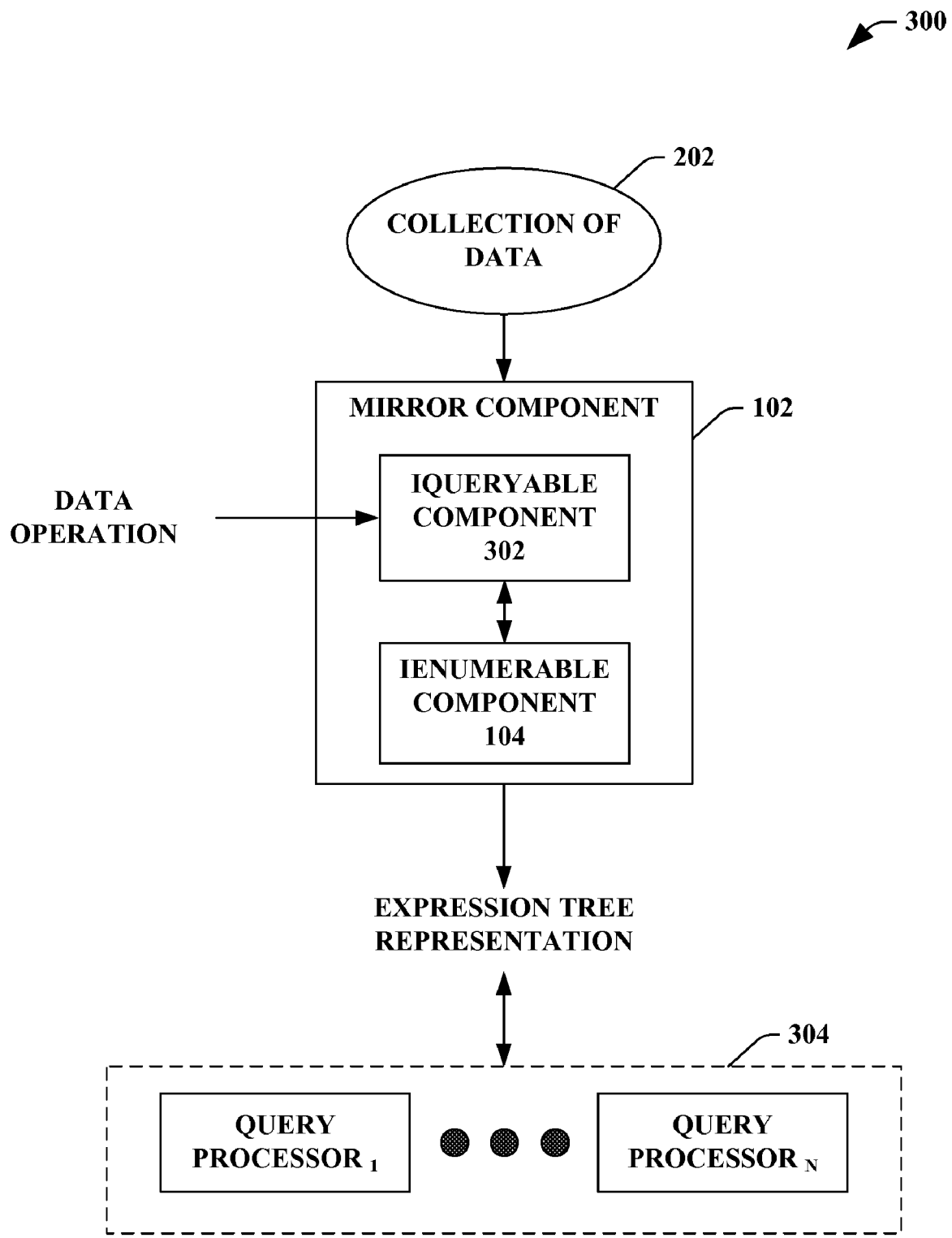
FIG. 3 illustrates a block diagram of an exemplary system that facilitates implementing a pluggable query processor to query a collection of data, wherein the query can be represented by an expression tree.

FIG. 3 illustrates a system 300 that facilitates implementing a pluggable query processor to query a collection of data and query that can be represented by an expression tree. The system 300 can include the mirror component 102 that can create an expression tree representation of code to allow the collection of data 202 to be queried utilizing any query processor regardless of the programming language, type, format, etc. For example, the query processor can implement data operations related to IEnumerable and IEnumerable<T> via IQueryable and IQueryable<T> without following the particular data type, characteristics, formats, and the like associated with IEnumerable and/or IEnumerable<T>.

Although the IEnumerable component 104 is depicted within the mirror component 102, it is to be appreciated that the IEnumerable component 104 can be a stand-alone component, incorporated into the mirror component 102, integrated with an IQueryable component 302, and/or any combination thereof. The IQueryable component 302 can receive a data operation, wherein such data operation can be mirrored off of the IEnumerable component 104 and respective functions. Thus, the data operations associated with IEnumerable and IEnumerable<T> can be implemented via IQueryable and IQueryable<T> in a more generic manner based upon the implementation of an expression tree representation rather than the data format associated with IEnumerable and IEnumerable<T>. Thus, the mirror component 102 can create an expression tree representation that can be queried by mirroring IEnumerable and IEnumerable<T>. It is to be appreciated and understood that if the expression tree for a particular collection of data is created, it need not be re-created for a disparate data operation and/or query. In other words, the expression tree representation can be re-used.

It is to be appreciated that the expression tree representation can be utilized by any suitable query processor(s) 304 to allow for the querying of data. The query processor(s) 304 can "plug-in" to allow the utilization of any suitable query operation and/or data operation. Moreover, there can be any number of query processor(s) 304 such as query processor $_1$ to query processor $_N$, where N is a positive integer. The query processor(s) 304 can plug-in to utilize the expression tree representation to allow for the querying of various collections of data.

Figure 4:
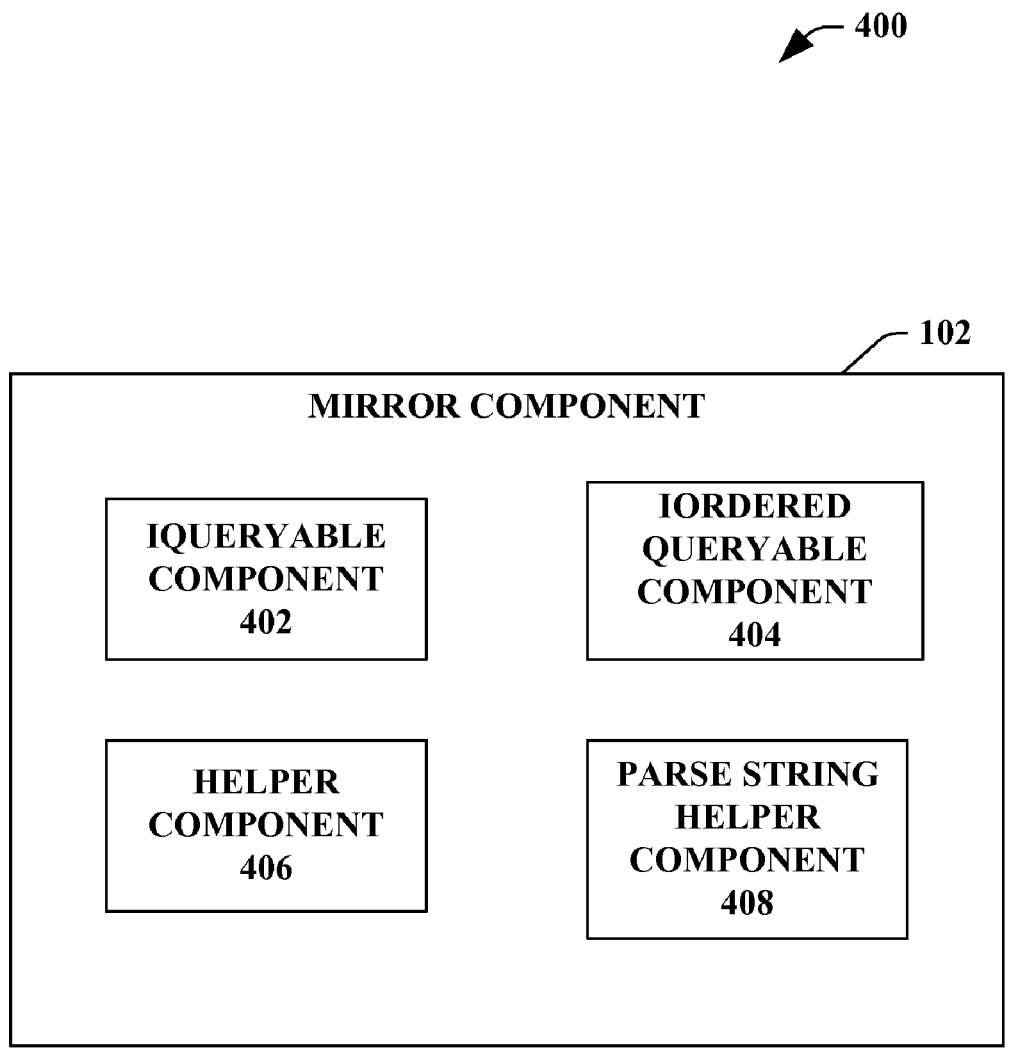
FIG. 4 illustrates a block diagram of an exemplary system that facilitates mirroring an IEnumerable interface and IEnumerable<T> interface to provide a generic interface to query data.

FIG. 4 illustrates a system 400 that facilitates mirroring an IEnumerable interface and IEnumerable<T> interface to provide a generic interface to query data. The system 400 can include the mirror component 102 that can provide a generic interface to allow types to signal that they support deep embedding of queries utilizing an expression tree representation. The mirror component 102 can further implement any standard sequence operators just like IEnumerable but can take expression trees as input instead of delegates. The system can further include an IQueryable component 402 that can implement the IQueryable interface. For instance, the following pseudo code can be implemented:

```
public interface IQueryable : IEnumerable {
    Expression Expression { get; }
    Type ElementType { get; }
    IQueryable CreateQuery(Expression expression);
    object Execute(Expression expression);
}
public interface IQueryable<T> : IEnumerable<T>, IQueryable {
    IQueryable<S> CreateQuery<S>(Expression expression);
    S Execute<S>(Expression expression);
}
```

The read-only property Expression returns the expression tree that the query currently represents, while the ElementType property returns the element type of the collection represented by the IQueryable. The CreateQuery method is a "virtual" constructor that given an expression tree creates a queryable. Similarly, Execute is a factory method for queries that return values that themselves are not queryable anymore.

The mirror component 102 can further include an IOrderedQueryable component 404 that can facilitate utilizing sequence operators. For instance, the following pseudo code can be implemented by the IOrderedQueryable component 404:

```
public interface IOrderedQueryable : IQueryable { }
    public interface IOrderedQueryable<T> : IQueryable<T>,
IOrderedQueryable { }
```

The IOrderedQueryable and IOrderedQueryable<T> mirror the OrderedSequence types that are used by the various OrderBy sequence operators.

The existing IEnumerable and IEnumerable <T> are extended with standard query operators (Where, Select, SelectMany, . . . ) that all take delegates as their arguments (as defined in any suitable namespace). For example, the extension method Where takes a source collection and a delegate and yields all values for which the predicate holds:

```
public static IEnumerable<T> Where<T>(this IEnumerable<T> source,
Func<T, bool> predicate) {
    foreach (T element in source) {
        if (predicate(element)) yield return element;
    }
}
```

For IQueryable and IQueryable <T>, the mirror component 102 can introduce extensions that implement the standard query operators using expression trees instead of delegates. For instance, here is a possible implementation of Where, note that it takes an expression tree instead of a delegate for the predicate argument, but for the rest the signature isomorphic to the signature of the Where extension method as defined on IEnumerable:

```
public static IQueryable<T> Where<T>(this IQueryable<T> source,
Expression<Func<T, bool>> predicate) {
  return source.CreateQuery<T>(
      Expression.Call(
((MethodInfo)MethodBase.GetCurrentMethod( )).
MakeGenericMethod(typeof(T)),
        null,
        new Expression[ ] { source.Expression, predicate }
    ));
}
```

The implementations of the other standard sequence operators is very similar, and effectively each creates an expression tree that corresponds to "calling themselves on the source." As a result, the implementation of the standard query operators is completely general and can be used by any application programmable interface (API) that wishes to consume expression trees (e.g., deep embedding).

Besides the mirror component 102 providing implementations of the standard query operators, the mirror component 102 can provide a ToQueryable( ) operator that can turn an IEnumerable into a Queryable. For instance, the following pseudo code can be utilized:

```
public static IQueryable<T> ToQueryable<T>(this IEnumerable<T>
source) { }
public static IQueryable ToQueryable(this IEnumerable source) { }
```

If the dynamic type of the source already is IQueryable, this operation amounts to a downcast. Otherwise, a new IQueryable instance is created that contains the source as a constant expression.

The mirror component 102 can also include a helper component 406 that facilitates compiling expression trees to delegates. In other words, the helper component 406 can provide a method to compile expression trees to a delegate via a helper method T Compile<T> (this Expression<T> f) that dynamically generates language integrated (LI) from a given expression tree such as the following:

```
Expression<Func<Customer, bool>> e = c => c.City == "London";
Func<Customer, bool> f = e.Compile( );
```

Furthermore, the mirror component 102 can include a parse string helper component 408 that can provide helper methods to parse strings to expression trees and provide a resolver for binding free variables inside strings. The parse string helper component 408 can introduce a set of helper methods for parsing a string representation of delegate. In the general case, the parser takes the list of parameters of the delegate this expression represents and a name resolver that given the names of free variables in the expression returns the member information (member info) to which that name is bound:

```
public static Expression<T> Parse<T>(string expr)
    public static Expression<T> Parse<T> (Parameters params, string expr,
NameResolver resolver)
```

Figure 5:
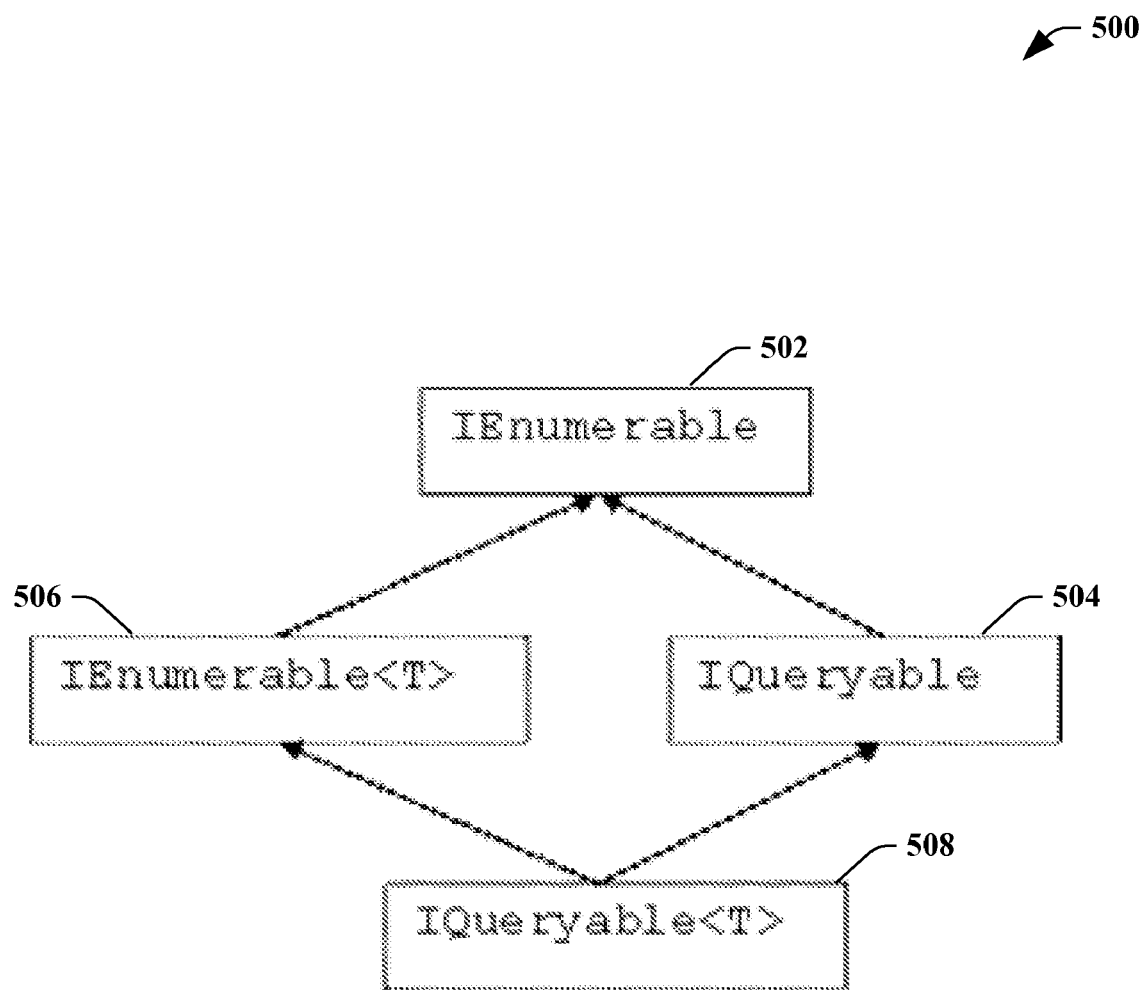
FIG. 5 illustrates a block diagram of exemplary relationships of various functions in accordance with the subject innovation.

FIG. 5 illustrates exemplary relationships 500 of various functions in accordance with the subject innovation. The exemplary relationships 500 illustrate the fact that IQueryable<T> 508 mirrors IEnumerable 502 and IQueryable 504 mirrors IEnumerable<T> 506. In other words, IQueryable: IEnumerable and IQueryable<T>: IQueryable, IEnumerable<T>.

Figure 6:
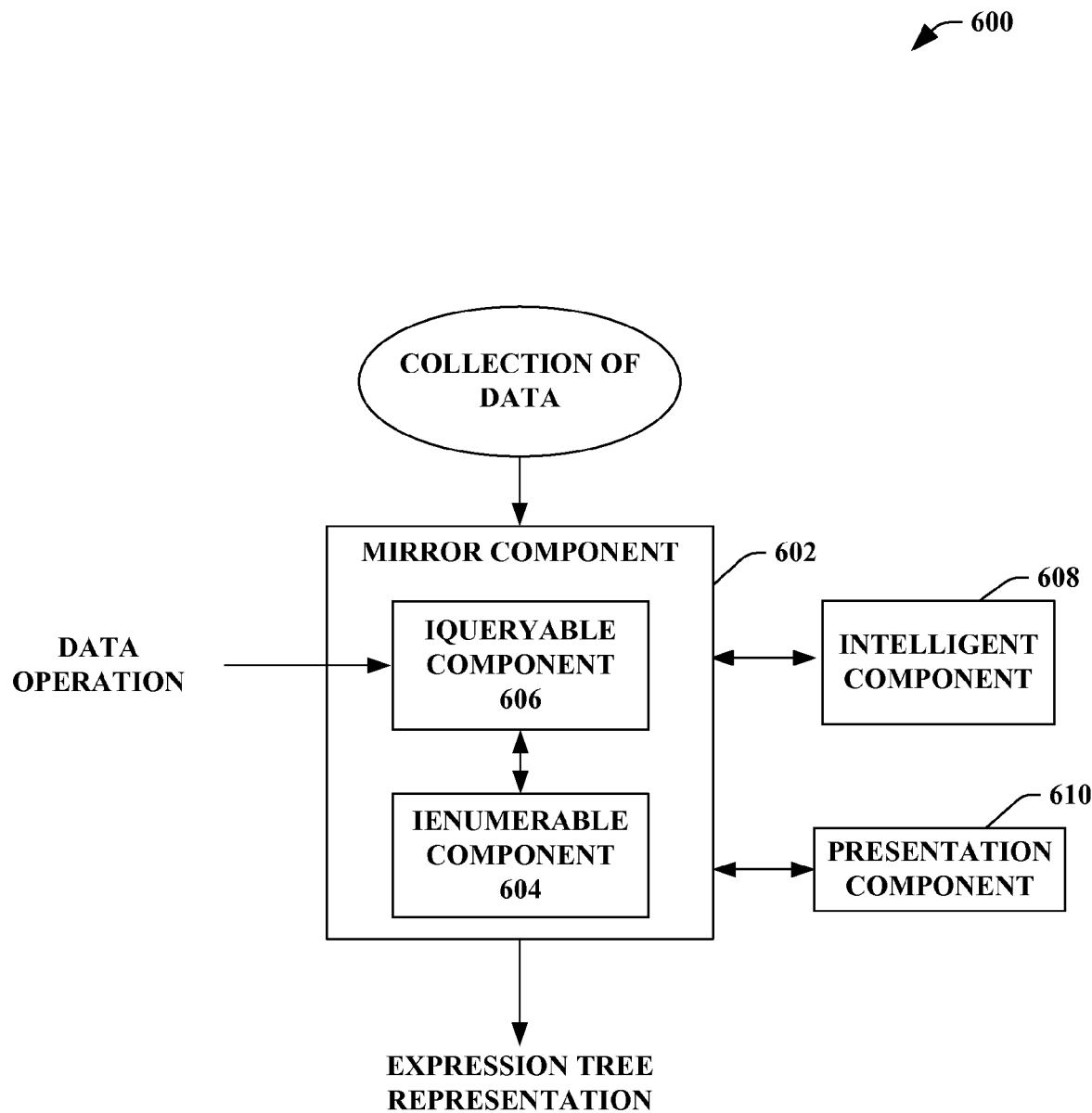
FIG. 6 illustrates a block diagram of an exemplary system that facilitates utilizing an expression tree representation of a collection of data to employ a data operation with a query processor.

FIG. 6 illustrates a system 600 that employs intelligence to facilitate utilizing an expression tree representation of a collection of data to employ a data operation with a query processor. The system 600 can include a mirror component 602, the IEnumerable component 604, and an IQueryable component 606, that can all be substantially similar to respective components as described in previous figures. The system 600 further includes an intelligent component 608. The intelligent component 608 can be utilized by the mirror component 602 to facilitate creating an expression tree representation to allow the implementation of a data operation. For example, the intelligent component 608 can infer expression tree representation, data operations, queries, query operators, collections of data, mirroring capabilities related to IEnumerable and IQueryable, etc.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The mirror component 602 can further utilize a presentation component 610 that provides various types of user interfaces to facilitate interaction between a user and any component coupled to the mirror component 602. As depicted, the presentation component 610 is a separate entity that can be utilized with the mirror component 602. However, it is to be appreciated that the presentation component 610 and/or similar view components can be incorporated into the mirror component 602 and/or a stand-alone unit. The presentation component 610 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the mirror component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
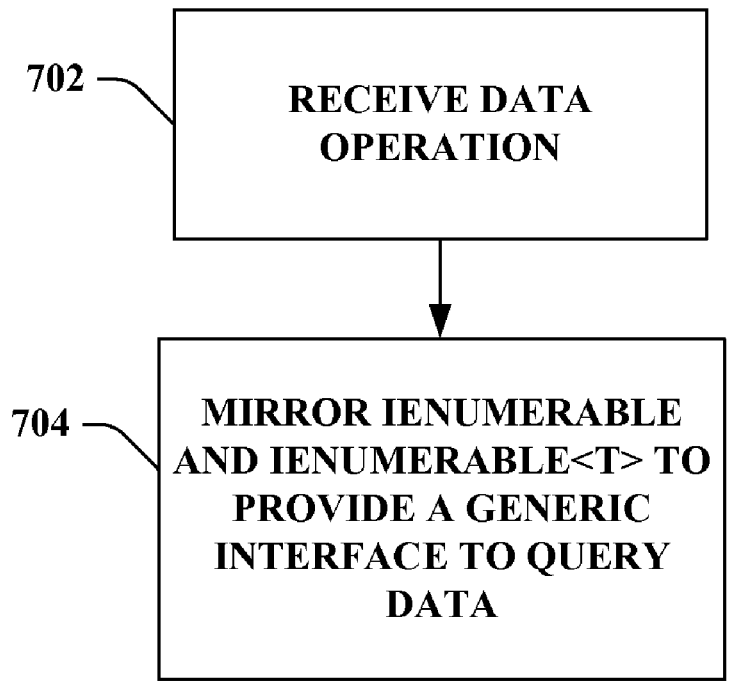
FIG. 7 illustrates an exemplary methodology for creating an expression tree representation to allow the implementation of a data operation.
Figure 8:
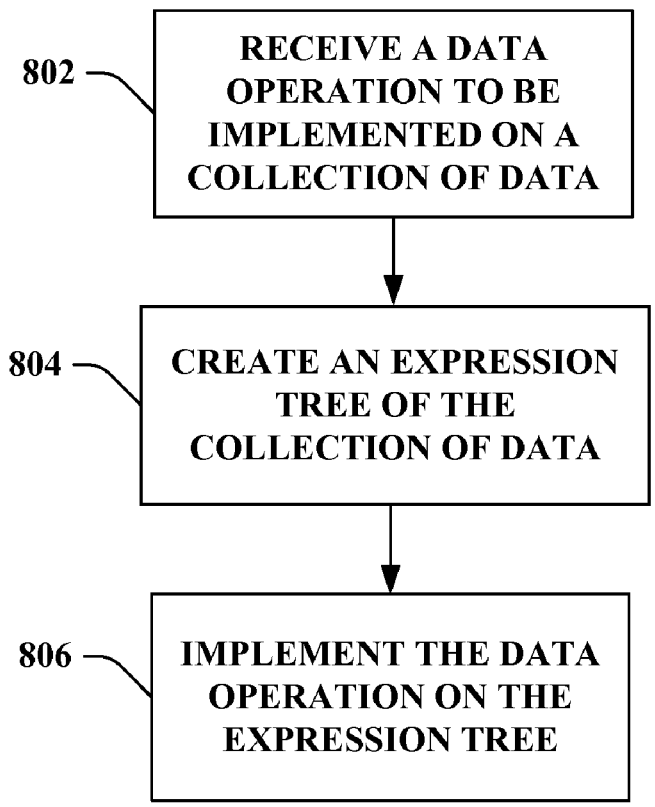
FIG. 8 illustrates an exemplary methodology that facilitates implementing a pluggable query processor to query a collection of data that can be represented by an expression tree.
Figure 9:
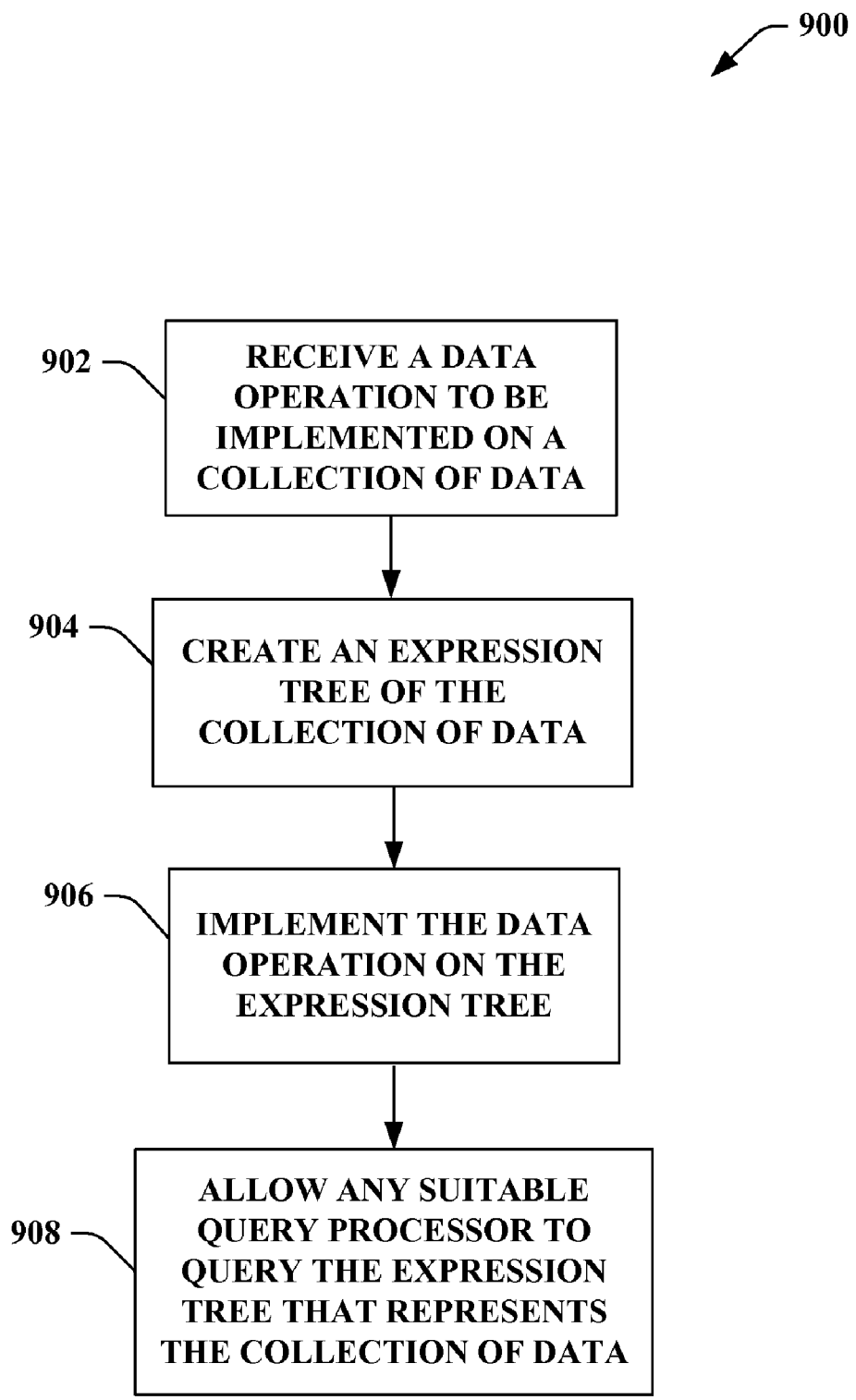
FIG. 9 illustrates an exemplary methodology for utilizing an expression tree representation of a collection of data to employ a data operation with a query processor.

FIGS. 7-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 that facilitates creating an expression tree representation to allow the implementation of a data operation. At reference numeral 702, a data operation can be received. In one example, the data operation can be implemented upon a collection of data, wherein such data operation can be, for example, a Where, Select, SelectMany, a filter function, a grouping function, a transformation function, any suitable function that is compatible with the IEnumerable interface and/or the IEnumerable<T> interface, etc. In another example, the data operation can be received from a user, an entity, a machine, a local machine, a remote machine, and the like.

At reference numeral 704, IEnumerable and IEnumerable<T> can be mirrored to provide a generic interface to query data. Based on data associated with IEnumerable having specific and rigid characteristics, a generic interface can replicate the functions associated with IEnumerable and, in particular, the IEnumerable interface and the IEnumerable<T> interface and their standard query operator extension methods. Such replication of IEnumerable allows a standard interface IQueryable<T> and a non-generic counterpart IQueryable to signal to any suitable type that deep embedding of queries via expression trees are supported. By representing the collections of data as expression trees, the IQueryable and IQueryable<T> interfaces can be generic interfaces that can be utilized to implement data operations since the data type is more conducive to query processor based on expression tree representation and thus allowing IEnumerable and IEnumerable<T> to be mirrored.

FIG. 8 illustrates a methodology 800 that facilitates implementing a pluggable query processor to query a collection of data that can be represented by an expression tree. At reference numeral 802, a data operation can be received that is to be implemented on a collection of data. At reference numeral 804, an expression tree representation of the collection of data can be created. The expression tree representation can be associated with the collection(s) of data. By representing the collections of data or queries as expression trees, an IQueryable interface and an IQueryable<T> interface can be generic interfaces that implement at least one data operation since the data type is more conducive to query processors based on the expression tree representation.

At reference numeral 806, the data operation can be implemented on the expression tree utilizing, for example, a query processor. The data operation can then be generically applied utilizing a technique that employs IQuerable and IQueryable<T> interfaces that mirror IEnumerable and IEnumerable<T> functionality. By mirroring the functionality of IEnumerable and IEnumeralbe<T>, data operations can be employed on the expression tree rather than the strict and rigid data collection typically associated with IEnumerable and IEnumerable<T>. Therefore, the method 800 facilitates querying relational data, extensible markup language (XML) objects, object oriented languages, programming languages, and the like. In general, it is to be appreciated that the expression tree representation allows any suitable query processor to implement data operations (Where, Select, SelectMany, a filter function, a grouping function, a transformation function, etc.) therewith.

FIG. 9 illustrates a methodology 900 for utilizing an expression tree representation of a collection of data to employ a data operation with a query processor. At reference numeral 902, a data operation can be received that can be implemented on a collection of data. The data operation can be, but is not limited to, a Where, Select, SelectMany, a filter function, a grouping function, a transformation function, any suitable function that is compatible with an IEnumerable interface and/or an IEnumerable<T> interface, etc. At reference numeral 904, an expression tree representing the collection of data can be created by utilizing the two interfaces IQueryable and IQueryable<T> which mirror the interfaces IEnumerable and IEnumerable<T>.

At reference numeral 906, the data operation can be implemented on the expression tree. By mirroring the functionality of IEnumerable and IEnumeralbe<T>, data operations can be employed on the expression tree (e.g., utilizing IQueryable and IQueryable<T>) rather than the strict and rigid data collection typically associated with IEnumerable and IEnumerable<T>. By representing the collections of data as expression trees, the IQueryable and IQueryable<T> interfaces can be generic interfaces that can be utilized to implement data operations since the data type is more conducive to query processor based on expression tree representation.

At reference numeral 908, any suitable query process can be plugged-in and query the expression tree that represents the collection of data. In general, it is to be appreciated that the expression tree representation allows any suitable query processor to implement data operations (Where, Select, SelectMany, a filter function, a grouping function, a transformation function, etc.) therewith. In other words, the method 900 provides a pluggable architecture for a query processor that allows data to be queried locally, remotely, over a wire, etc. regardless of programming language and/or format. For instance, the method 900 allows a representation of the query expression to be created, then sent to the data and be allowed to be implemented remotely. Moreover, such data can be queried in a remote location the same as querying data in the memory of a local computer.

Figure 10:
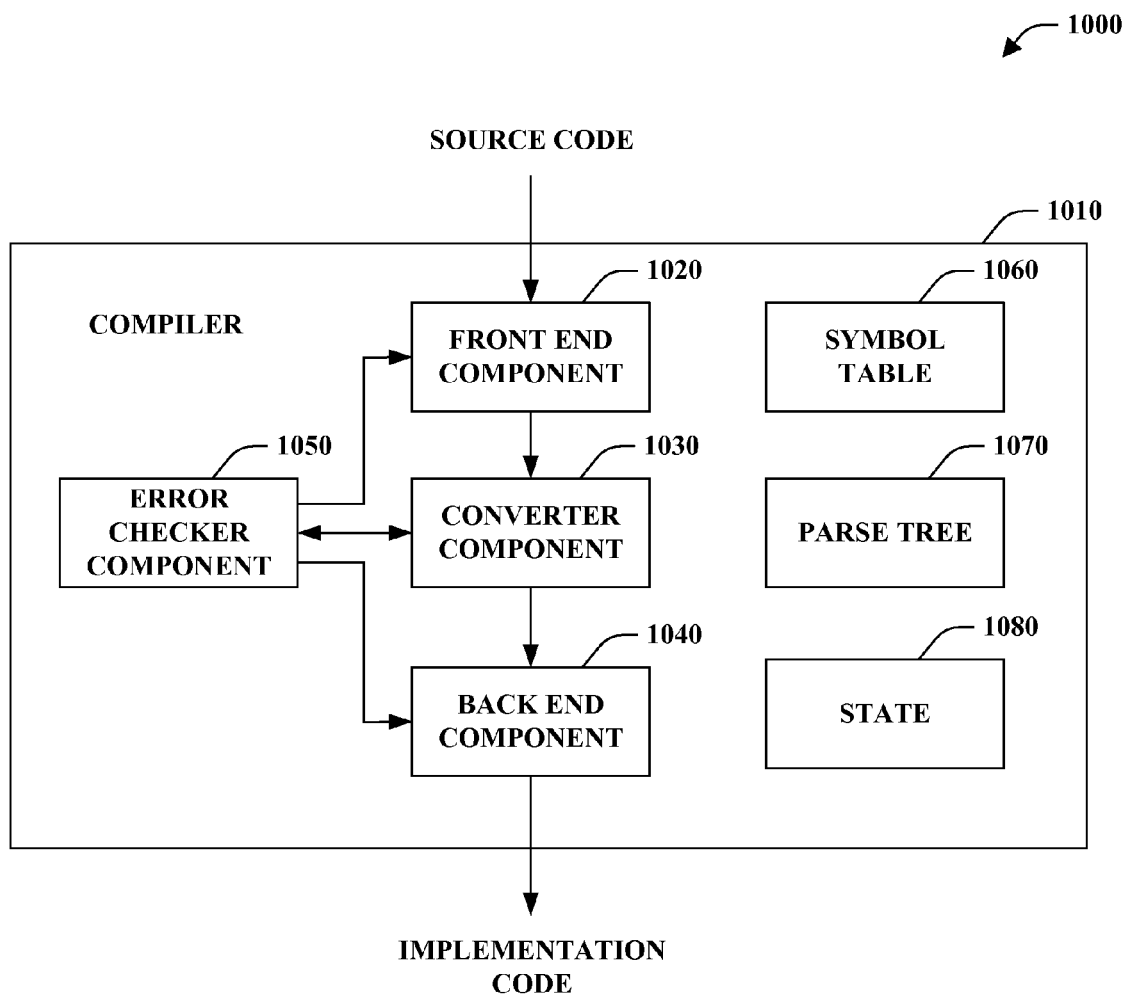
FIG. 10 is a schematic block diagram of an example compiler operating environment.

FIG. 10 is a block diagram depicting a compiler environment 1000 that can be utilized to produce implementation code (e.g., executable, intermediate language . . . ) in accordance with the subject innovation. The compiler environment 1000 includes a compiler 1010 including a front-end component 1020, a converter component 1030, a back-end component 1040, an error checker component 1050, a symbol table 1060, a parse tree 1070, and state 1080. The compiler 1010 accepts source code as input and produces implementation code as output. The input can include but is not limited to delimited programmatic expressions or qualified identifier as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

The compiler 1020 can accept as input a file having source code associated with processing of a sequence of elements. The source code may include various expressions and associated functions, methods and/or other programmatic constructs. The compiler 1020 may process source code in conjunction with one or more components for analyzing constructs and generating or injecting code.

A front-end component 1020 reads and performs lexical analysis upon the source code. In essence, the front-end component 1020 reads and translates a sequence of characters (e.g. alphanumeric) in the source code into syntactic elements or tokens, indicating constants, identifiers, operator symbols, keywords, and punctuation among other things.

The converter component 1030 parses the tokens into an intermediate representation. For instance, the converter component 1030 can check syntax and group tokens into expressions or other syntactic structures, which in turn coalesce into statement trees. Conceptually, these trees form a parse tree 1070. Furthermore and as appropriate, the converter module 1030 can place entries into a symbol table 1030 that lists symbol names and type information used in the source code along with related characteristics.

A state 1080 can be employed to track the progress of the compiler 1010 in processing the received or retrieved source code and forming the parse tree 1070. For example, different state values indicate that the compiler 1010 is at the start of a class definition or functions, has just declared a class member, or has completed an expression. As the compiler progresses, it continually updates the state 1080. The compiler 1010 may partially or fully expose the state 1080 to an outside entity, which can then provide input to the compiler 1010.

Based upon constructs or other signals in the source code (or if the opportunity is otherwise recognized), the converter component 1030 or another component can inject code corresponding to facilitate efficient and proper execution. Rules coded into the converter component 1030 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1060 and the parse tree 1070, a back-end component 1040 can translate the intermediate representation into output code. The back-end component 1040 converts the intermediate representation into instructions executable in or by a target processor, into memory allocations for variables, and so forth. The output code can be executable by a real processor, but output code that is executable by a virtual processor can also be provided.

Furthermore, the front-end component 1020 and the back end component 1040 can perform additional functions, such as code optimization, and can perform the described operations as a single phase or in multiple phases. Various other aspects of the components of compiler 1010 are conventional in nature and can be substituted with components performing equivalent functions. Additionally, at various stages during processing of the source code, an error checker component 1050 can check for errors such as errors in lexical structure, syntax errors, and even semantic errors. Upon detection error, checker component 1050 can halt compilation and generate a message indicative of the error.

Figure 11:
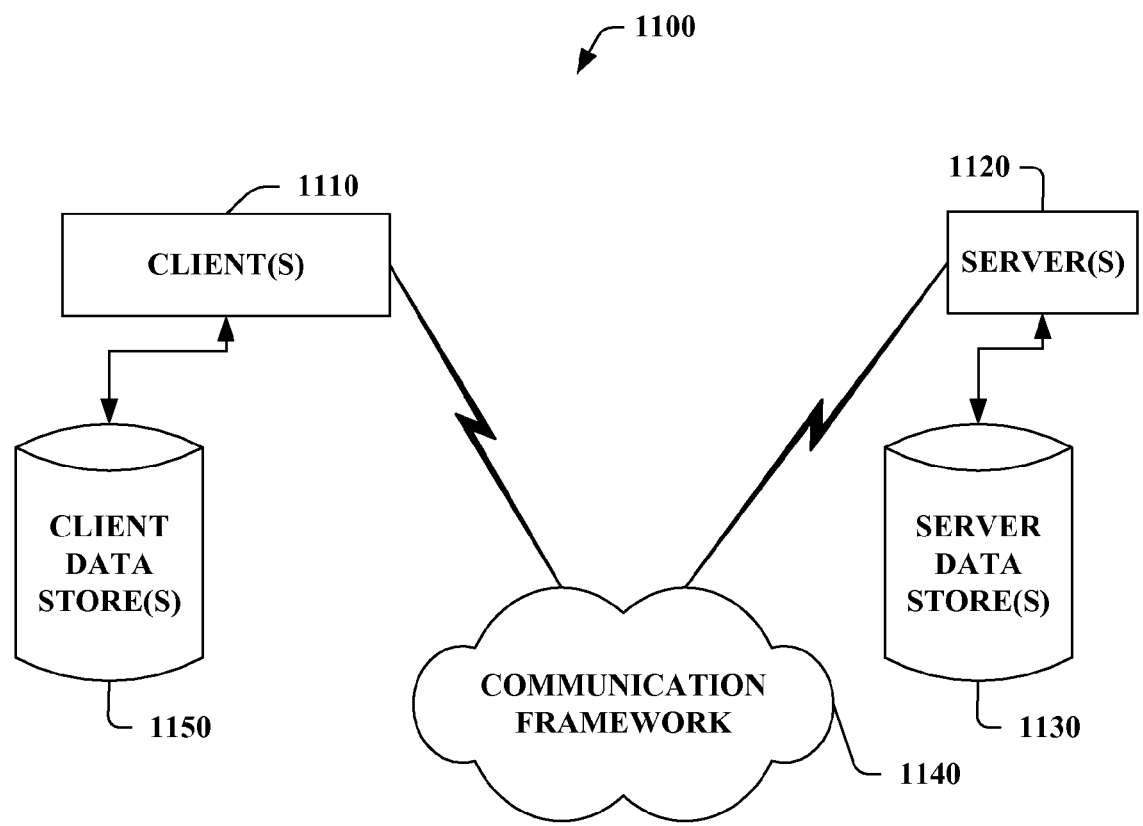
FIG. 11 illustrates an exemplary networking environment, wherein the novel aspects of the claimed subject matter can be employed.
Figure 12:
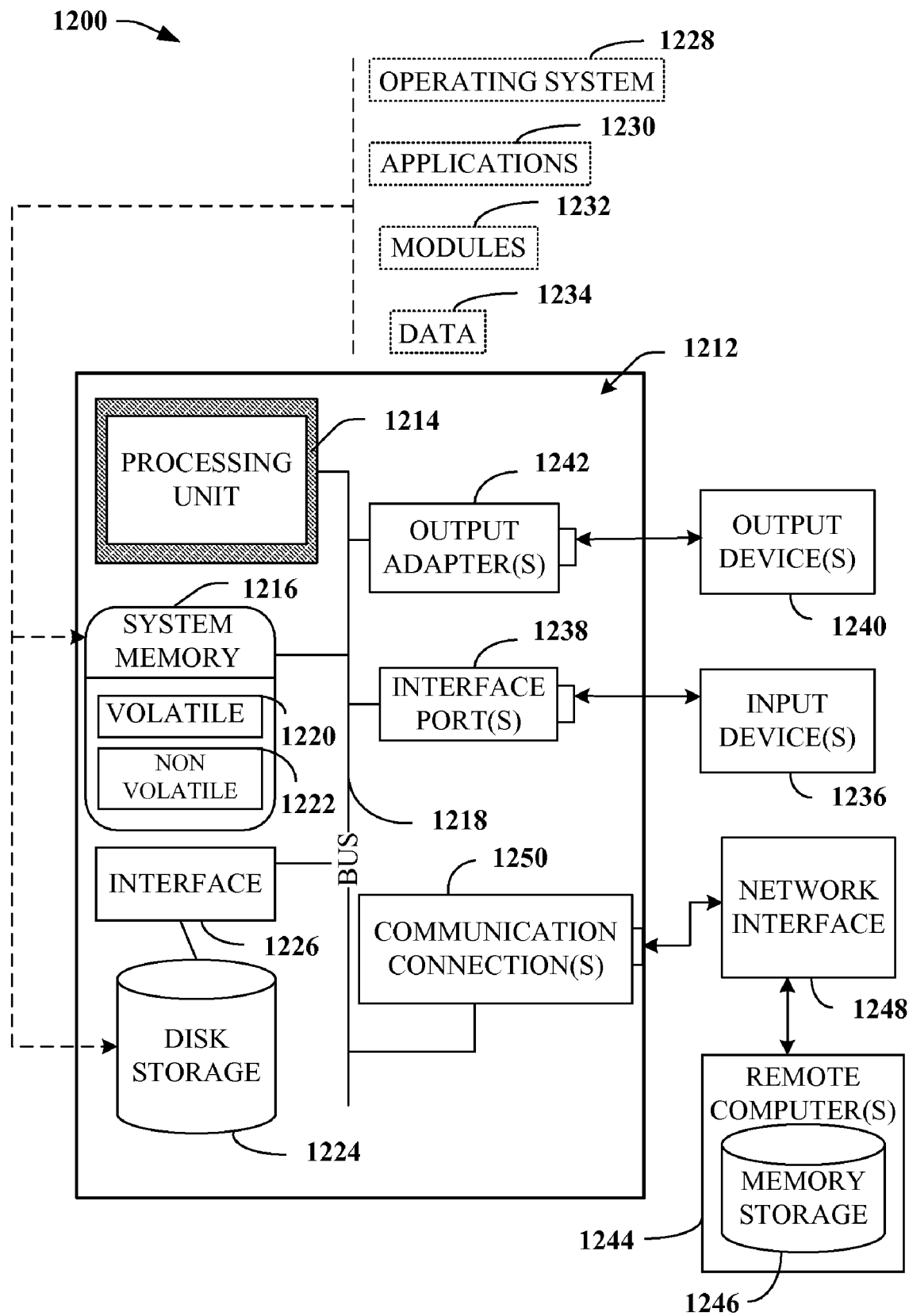
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a mirror component that provides a generic interface to provide data operations on collections of data utilizing an expression tree representation, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1294), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer storage medium having stored thereon a data structure that represents an application program interface that types implement to signal that they support deep embedding of queries via expression trees, the application programming interface comprising:
   (A) a generic interface that enables the creation of an expression tree representation to allow the implementation of standard query operator extension methods,
   (B) wherein the generic interface inherits the IEnumerable or IEnumerable<T> interface such that each standard query operator extension method implemented by the IEnumerable or IEnumberabe<T> interface is implemented by the generic interface,
   (C) wherein the generic interface implements the standard query operator extension methods by taking an expression tree as an argument rather than a delegate,
   (D) wherein, upon executing the standard query operator extension methods, the results of the standard query operator extension methods are represented in the expression tree,
   (E) wherein the expression tree provides a generic representation of the results of the standard query operator extension methods such that the standard query operator extension methods can be executed against any one of a plurality of different types of data stores and are not specific to a particular type of data store, and
   (F) wherein an object created using the generic interface is a Queryable object, and wherein the generic interface further implements an operator that converts an IEnumerable object into a Queryable object.

2. The computer storage medium of claim 1 wherein the plurality of different types of data stores includes a relational data store, an extensible markup language (XML) data store, or an object oriented data store.

3. The computer storage medium of claim 1 wherein the standard query operator extension methods include a Where, a Select, a SelectMany, a filter function, a grouping function, and a transformation function.

4. The computer storage medium of claim 1 wherein a query processor implements the generic interface.

5. The computer storage medium of claim 1 wherein the standard query operator extension methods are executed locally or remotely.

6. The computer storage medium of claim 1 wherein the expression tree comprises an uncompiled and unevaluated data structure that represents a standard query operator extension method.

7. The computer storage medium of claim 6 wherein the generic interface implements a method by which an expression tree is compiled into a delegate.

8. The computer storage medium of claim 1 wherein the generic interface implements methods by which a string representation of a delegate is parsed into an expression tree.

9. A system comprising a processor and memory that stores a data structure that represents an application program interface that types implement to signal that they support deep embedding of queries via expression trees, the application programming interface comprising:
(A) a generic interface that enables the creation of an expression tree representation to allow the implementation of standard query operator extension methods,
(B) wherein the generic interface inherits the IEnumerable or IEnumerable<T> interface such that each standard query operator extension method implemented by the IEnumerable or IEnumberabe<T> interface is implemented by the generic interface,
(C) wherein the generic interface implements the standard query operator extension methods by taking an expression tree as an argument rather than a delegate,
(D) wherein, upon executing the standard query operator extension methods, the results of the standard query operator extension methods are represented in the expression tree,
(E) wherein the expression tree provides a generic representation of the results of the standard query operator extension methods such that the standard query operator extension methods can be executed against any one of a plurality of different types of data stores and are not specific to a particular type of data store, and
(F) wherein an object created using the generic interface is a Queryable object, and wherein the generic interface further implements an operator that converts an IEnumerable object into a Queryable object.

10. The system of claim 9 wherein the plurality of different types of data stores includes a relational data store, an extensible markup language (XML) data store, or an object oriented data store.

11. The system of claim 9 wherein the standard query operator extension methods include a Where, a Select, a SelectMany, a filter function, a grouping function, and a transformation function.

12. The system of claim 9 wherein a query processor implements the generic interface.

13. The system of claim 9 wherein the standard query operator extension methods are executed locally or remotely.

14. The system of claim 9 wherein the expression tree comprises an uncompiled and unevaluated data structure that represents a standard query operator extension method.

15. The system of claim 9 wherein the generic interface implements a method by which an expression tree is compiled into a delegate.

16. The system of claim 9 wherein the generic interface implements methods by which a string representation of a delegate is parsed into an expression tree.

* * * * *